United States Patent
Liu et al.

(10) Patent No.: US 10,070,412 B1
(45) Date of Patent: Sep. 4, 2018

(54) PAGING BASED ON INDIVIDUAL USER MOBILITY PATTERNS

(71) Applicant: AT&T Intellectual Property I, L.P., Atlanta, GA (US)

(72) Inventors: Guangtian Liu, Austin, TX (US); Wei Yuan, Frisco, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/492,331

(22) Filed: Apr. 20, 2017

(51) Int. Cl.
- *H04W 68/00* (2009.01)
- *H04W 68/02* (2009.01)
- *H04W 64/00* (2009.01)
- *H04W 8/26* (2009.01)
- *H04W 8/00* (2009.01)

(52) U.S. Cl.
CPC ........... *H04W 68/02* (2013.01); *H04W 8/005* (2013.01); *H04W 8/26* (2013.01); *H04W 64/006* (2013.01); *H04W 64/003* (2013.01)

(58) Field of Classification Search
CPC .............................. H04W 68/02; H04W 60/00
USPC ........ 455/456.1, 458, 435.1, 432.3; 370/312, 370/311, 329; 342/457
See application file for complete search history.

(56) References Cited

U.S. PATENT DOCUMENTS

| | | |
|---|---|---|
| 5,875,400 A | 2/1999 | Madhavapeddy et al. |
| 6,181,945 B1 | 1/2001 | Lee |
| 6,393,285 B1 | 5/2002 | Stephens |
| 7,142,858 B2 | 11/2006 | Aoki et al. |
| 7,164,926 B2 | 1/2007 | Papadimitriou et al. |
| 7,351,238 B2 | 4/2008 | Lee et al. |
| 7,496,083 B2 | 2/2009 | Omae et al. |
| 8,271,006 B1 | 9/2012 | Gilbert et al. |
| 8,433,345 B2 | 4/2013 | Li et al. |
| 8,478,293 B2 | 7/2013 | Zhao |
| 8,571,582 B2 | 10/2013 | Lopez et al. |

(Continued)

FOREIGN PATENT DOCUMENTS

| | | |
|---|---|---|
| EP | 1071304 A1 | 1/2001 |
| EP | 2015101 A2 | 4/2011 |

(Continued)

OTHER PUBLICATIONS

Vincent W.-S. Wong et al., "Location management for next-generation personal communications networks." IEEE Network vol. 14 Issue 5 (Sep. 1, 2000): pp. 18-24. http://www.ece.ubc.ca/~vincentw/J/WLj00.pdf.

(Continued)

*Primary Examiner* — Kiet Doan

(57) ABSTRACT

In one example, the present disclosure describes a device, computer-readable medium, and method for paging a user endpoint device based on the mobility patterns of the individual user associated with the user endpoint device. For instance, in one example, a method includes determining a paging zone for a user endpoint device. The paging zone includes a first base station to page the user endpoint device, where the first base station is included in the paging zone based at least in part on a historical mobility pattern of the user endpoint device and on present network conditions around the user endpoint device. An instruction is sent to the first base station. The instruction instructs the first base station to send a paging request message to the user endpoint device.

20 Claims, 4 Drawing Sheets

(56) References Cited

U.S. PATENT DOCUMENTS

| | | | |
|---|---|---|---|
| 8,606,291 B2 | 12/2013 | Voyer et al. | |
| 8,626,203 B1* | 1/2014 | Singh | H04W 68/00 455/426.1 |
| 8,755,808 B2 | 6/2014 | Knauft et al. | |
| 8,787,958 B2 | 7/2014 | Yin et al. | |
| 9,198,158 B2 | 11/2015 | Knauft | |
| 9,439,169 B2 | 9/2016 | Irigi et al. | |
| 9,504,013 B2 | 11/2016 | Ahluwalia et al. | |
| 2006/0068802 A1 | 3/2006 | Benco et al. | |
| 2014/0031056 A1 | 1/2014 | Cao | |
| 2014/0364155 A1 | 12/2014 | Lwai | |
| 2015/0038180 A1 | 2/2015 | Quick et al. | |
| 2015/0163639 A1* | 6/2015 | Kilpatrick, II | H04W 4/028 455/456.1 |

FOREIGN PATENT DOCUMENTS

| | | |
|---|---|---|
| JP | 06319168 A | 11/1994 |
| TW | 201446051 A | 12/2014 |

OTHER PUBLICATIONS

Ian F. Akyildiz et al., "A survey of mobility management in next-generation all-IP-based wireless systems." IEEE Wireless Communications vol. 11 Issue 4 (Aug. 24, 2004): pp. 16-28. http://wiki.unik.no/media/Master/Akylildiz2004.pdf.

Wenchao Ma et al., "Mobility management strategy based on user mobility patterns in wireless networks." IEEE Transactions on Vehicular Technology vol. 56 Issue 1 (Jan. 22, 2007): pp. 322-330. http://www.fang.ece.ufl.edu/mypaper/tvt07ma.pdf.

Ian F. Akyildiz et al., "Movement-based location update and selective paging for PCS networks." IEEE/ACM Transactions on Networking vol. 4 Issue 4 (Aug. 1, 1996): pp. 629-638. https://ir.nctu.edu.tw/bitstream/11536/1122/1/A1996VE43600013.pdf.

B. P. Vijay Kumar et al., "Prediction-based location management using multilayer neural networks." Journal of Indian Institute of Science vol. 82 Issue 1 (2002): pp. 7-23. http://journal.library.iisc.ernet.in/archives/vol200201/paper1/vijay.pdf.

\* cited by examiner

PAGING BASED ON INDIVIDUAL USER MOBILITY PATTERNS

The present disclosure relates generally to wireless networking, and relates more particularly to devices, non-transitory computer-readable media, and methods for optimizing network paging performance.

BACKGROUND

In the mobility context, paging refers to the delivery of a message to a user endpoint device that is connected to the network. Paging may be initiated to alert the user endpoint device to one or more events. For instance, a paging message can be initiated in the core network to alert the user endpoint device to an incoming call, short messaging service (SMS) message, email message, or data session from the circuit-switched (CS) or the packet-switched (PS) domain.

In some examples (e.g., in 3rd Generation or 3G networks), a paging message can also be initiated in the Universal Mobile Telecommunications Service (UMTS) Terrestrial Radio Access Network (UTRAN) to alert the user endpoint device to a change in the broadcast control channel (BCCH), a release the radio resource control (RRC) connection, or an update to an earthquake and tsunami warning system (ETWS).

SUMMARY

In one example, the present disclosure describes a device, computer-readable medium, and method for paging a user endpoint device based on the mobility patterns of the individual user associated with the user endpoint device. For instance, in one example, a method includes determining a paging zone for a user endpoint device. The paging zone includes a first base station to page the user endpoint device, where the first base station is included in the paging zone based at least in part on a historical mobility pattern of the user endpoint device and on present network conditions around the user endpoint device. An instruction is sent to the first base station. The instruction instructs the first base station to send a paging request message to the user endpoint device.

In another example, a device includes a processor and a computer-readable medium storing instructions which, when executed by the processor, cause the processor to perform operations. The operations include determining a paging zone for a user endpoint device, wherein the paging zone includes a first base station to page the user endpoint device, and wherein the first base station is included in the paging zone based at least in part on a historical mobility pattern of the user endpoint device and on present network conditions around the user endpoint device, and sending an instruction to the first base station, wherein the instruction instructs the first base station to send a paging request message to the user endpoint device.

In another example, and apparatus includes a processor and an output device. The processor determines a paging zone for a user endpoint device. The paging zone includes a first base station to page the user endpoint device, where the first base station is included in the paging zone based at least in part on a historical mobility pattern of the user endpoint device and on present network conditions around the user endpoint device. The output device sends an instruction to the first base station, wherein the instruction instructs the first base station to send a paging request message to the user endpoint device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a means for paging a user endpoint device based on the mobility patterns of the individual user associated with the user endpoint device. As discussed above, paging may be initiated in a mobility network to alert the user endpoint device to an incoming call or SMS message. When a call or data service is targeted to a particular user or user endpoint device, the mobility network needs to locate the user in a timely manner to ensure that the user's experience is satisfactory (e.g., accessibility is high, dropped calls are minimized, etc.).

However, because user endpoint devices spend much of their time in idle mode to preserve battery life, it can be difficult and inefficient to identify the base station that is serving the user endpoint device when the user endpoint device is to be paged. For instance, although tracking area (TA)-based paging methodologies are generally successful in locating a targeted user endpoint device, they may have to send many messages to many base stations before the targeted user endpoint device is located. This increases the overall paging load on the base stations. Even other methodologies that seek to minimize the overall paging load may need to send messages to many base stations, because they tend to focus on some number of last-known base stations that served the targeted user endpoint device, when the targeted user endpoint device may no longer be anywhere near their service areas.

Examples of the present disclosure generate a paging zone for a user endpoint device based on the user's historical, individual mobility patterns (e.g., repeating, observed patterns of behavior, as opposed to isolated mobility events such as simply the last-known location) and on present network conditions around the user endpoint device operated by the user (e.g., observed present network radio frequency, network traffic, and network mobility conditions in a geographic area within a defined radius of the user endpoint device). The paging zone represents an area in which the targeted user endpoint device is expected to be at a given time. By focusing on where the targeted user endpoint device is expected to be at the given time, rather than where it last was, the base station(s) to be paged can be selected in a less arbitrary manner. This minimizes the overall paging load on the base stations and improves paging accuracy, which, in turn, improves the user experience.

Within the context of the present disclosure, a "tracking area" is understood to refer to a geographical coverage area served by a predefined set of base stations. The tracking area that a given base station i resides in is referred to herein as "TA(i)." "TA_list(i)," as used herein, refers to an expanded tracking areas comprising the tracking area Ta(i) and its neighboring (e.g., immediately adjacent) tracking areas.

Figure 1:
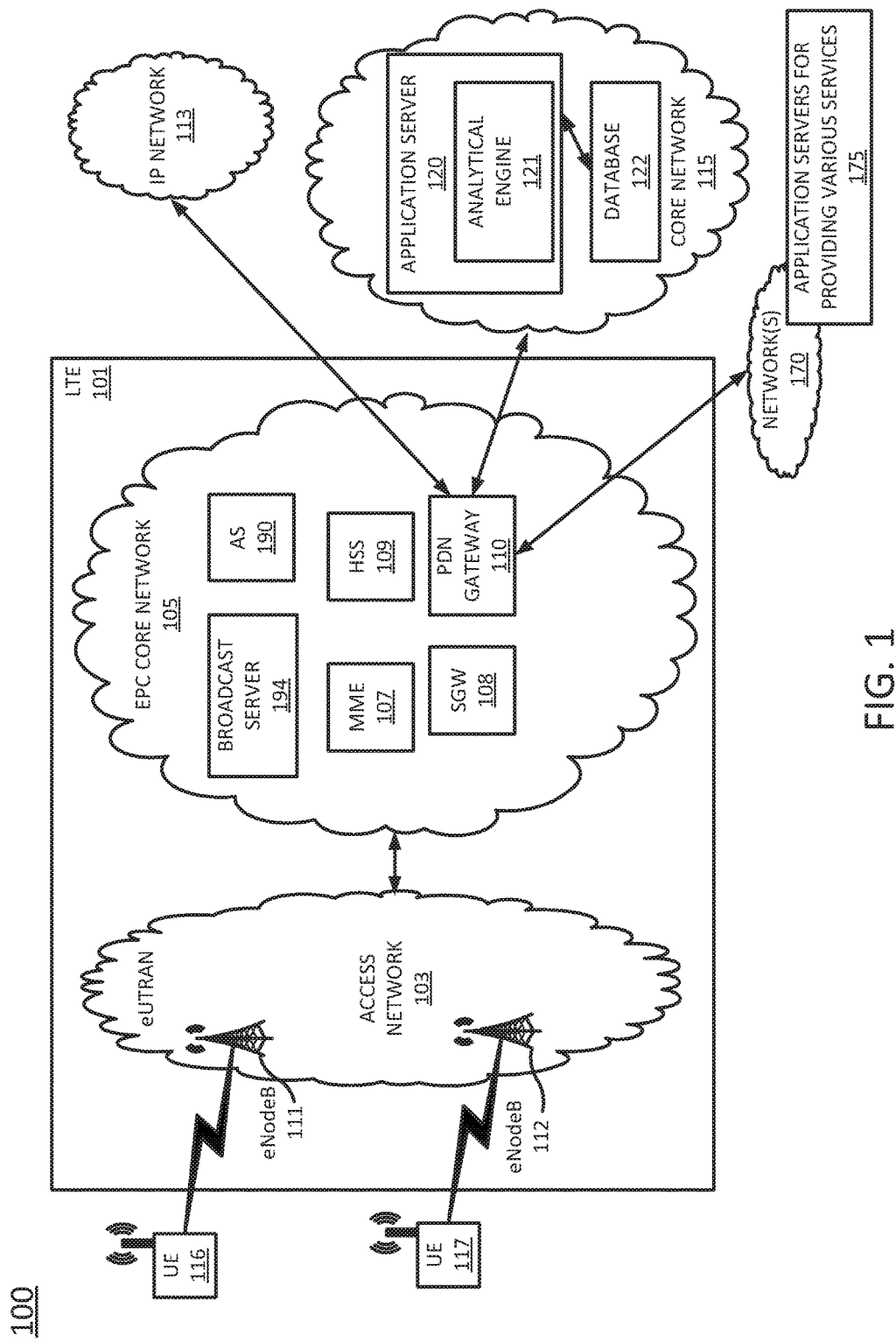
FIG. 1 illustrates an example network related to the present disclosure.

To better understand the present disclosure, FIG. 1 illustrates an example network, or system 100 suitable for implementing embodiments of the present disclosure for paging a user endpoint device. In one example, the system 100 comprises a Long Term Evolution (LTE) network 101, an IP network 113, and a core network 115, e.g., an IP Multimedia Subsystem (IMS) core network. In one example, system 100 is provided and operated by a single network operator or network service provider. FIG. 1 also illustrates various user endpoint devices, e.g., LTE user endpoint devices 116 and 117. The user mobile endpoint devices 116 and 117 may each comprise a cellular telephone, a smartphone, a tablet computing device, a laptop computer, a pair of computing glasses, a wireless enabled wristwatch, or any other cellular-capable mobile telephony, a device deployed in a vehicle, and computing device (broadly, "mobile endpoint devices"). In another embodiment, the user endpoint devices 116 and 117 may be stationary devices, e.g., set top boxes, home gateways, security panels at a premises, home appliances, Internet of Things (IoT) sensors, and the like. For the purposes of providing illustrated examples, endpoint devices 116 and 117 will be deemed to be mobile devices in various examples discussed below, but it should be noted that endpoint devices 116 and 117 can be both mobile devices and/or stationary devices.

In one embodiment, each of the user mobile endpoint devices is capable of executing one or more mobile software applications, e.g., software applications for transmitting and/or receiving multimedia content, gaming, shopping, surfing the web, sending and receiving data, sending and receiving messages such as emails and text messages, implementing call sessions such as voice over IP calls, video conferencing, and the like.

In one example, the LTE network 101 comprises an access network 103 and a core network 105. In one example, the access network 103 comprises an evolved Universal Terrestrial Radio Access Network (eUTRAN). The eUTRANs are the air interfaces of the $3^{rd}$ Generation Partnership Project (3GPP) LTE specifications for mobile networks. In one example, the core network 105 comprises an Evolved Packet Core (EPC) network. An EPC network provides various functions that support wireless services in the LTE environment. In one example, an EPC network is an Internet Protocol (IP) packet core network that supports both real-time and non-real-time service delivery across a LTE network, e.g., as specified by the 3GPP standards. In one example, all eNodeBs (e.g., base stations) in the access network 103 are in communication with the EPC network 105. In operation, LTE user equipment or user endpoints (UE) 116 may access wireless services via the eNodeB 111 and the LTE UE 117 may access wireless services via the eNodeB 112 located in the access network 103. It should be noted that any number of eNodeBs can be deployed in an eUTRAN. In one illustrative example, the access network 103 may comprise one or more eNodeBs.

In EPC network 105, network devices Mobility Management Entity (MME) 107 and Serving Gateway (SGW) 108 support various functions as part of the LTE network 101. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW.

The EPC network 105 may also include an application server (AS) 190. In one embodiment, AS 190 may comprise a computing system, such as computing system 400 depicted in FIG. 4, and may be configured to provide one or more functions for determining a base station to contact in order to page a user endpoint device, and for performing various other operations in accordance with the present disclosure. Accordingly, the AS 190 may be connected directly or indirectly to any one or more network elements of EPC network 105, and of the system 100 in general, that are configured to gather and forward network analytic information, such as signaling and traffic data, and other information and statistics to AS 190 and to receive instructions from AS 190. AS 190 may be further configured to perform other functions such as those described below in connection with the example method 200 of FIG. 2.

In one example, AS 190 may be deployed in a network operations center (NOC) of a cellular network operator, e.g., an entity operating the EPC network 105, LTE network 101, access network 103, and so on. Due to the relatively large number of connections available between AS 190 and other network elements, none of the actual links to the application server are shown in FIG. 1. Similarly, links between MME 107, SGW 108, broadcast server 194, eNodeBs 111 and 112, PDN gateway 110, and other components of system 100 are also omitted for clarity.

It should be noted that the LTE network 101 is disclosed to provide a very brief summary description of the underlying framework that is utilized to provide a cellular or mobility service. Similarly, various other networks 170 having respective application servers 175 can also be deployed by a single service provider, e.g., a network service provider in providing a plurality of other services, e.g., telephony services, data services, multimedia delivery services, connected car services, connected premises services, and so on. For clarity reasons, the underlying framework for these other networks 170 are not shown in FIG. 1, but it is understood that a single network service provider is capable of providing two or more of these services.

As such, the foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, AS 190, broadcast server 194 and/or other network components may be deployed in core network 115 instead of being deployed within the EPC network 105, or in other portions of system 100 that are not shown, while providing essentially the same functionality. For example, the functionality of AS 190 for a cellular service can be implemented via the application server 120 having an analytical engine 121 utilizing database 122 to store various data associated with the mobile traffic for the cellular service. In fact, in one embodiment the application server 120 is configured as a dedicated paging server for creating paging zones that are tailored to individual users of the network 100 based on their historical mobility patterns.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., 2G network, 3G network and the like), for modeling mobile traffic for providing a policy. In fact, the above listing of various services should not be deemed to be an exhaustive listing of services. Thus, these and other modifications are all contemplated within the scope of the present disclosure.

The present disclosure defines, for each base station i and user endpoint device u in a network, a probability p(i, j, u) that the user endpoint device u responds to a paging request message from base station j when the last-known base station to have been serving the user endpoint device u was the base station i. The probability p(i, j, u) can be computed based on historical mobility patterns for the user endpoint device u, for example by counting the number of paging responses received by the base station j from the user endpoint device u when the last-known location of the user endpoint device u was in the tracking area served by the base station i, or TA(i). The probability p(i, j, u) could also be computed based on an estimated pattern of movement (e.g., speed and direction) of the user endpoint device u and the geographical locations of the base stations i and j.

The present disclosure also defines a paging zone, z(i, u) for the user endpoint device u when the last-known location of the user endpoint device was served by the base station i. The paging zone z(i, u) may be created or updated whenever the user endpoint device u is connected to the network (e.g., not in idle mode) or whenever the user endpoint device u moves to a new tracking area (e.g., via a tracking area update, or TAU, procedure).

Figure 2:
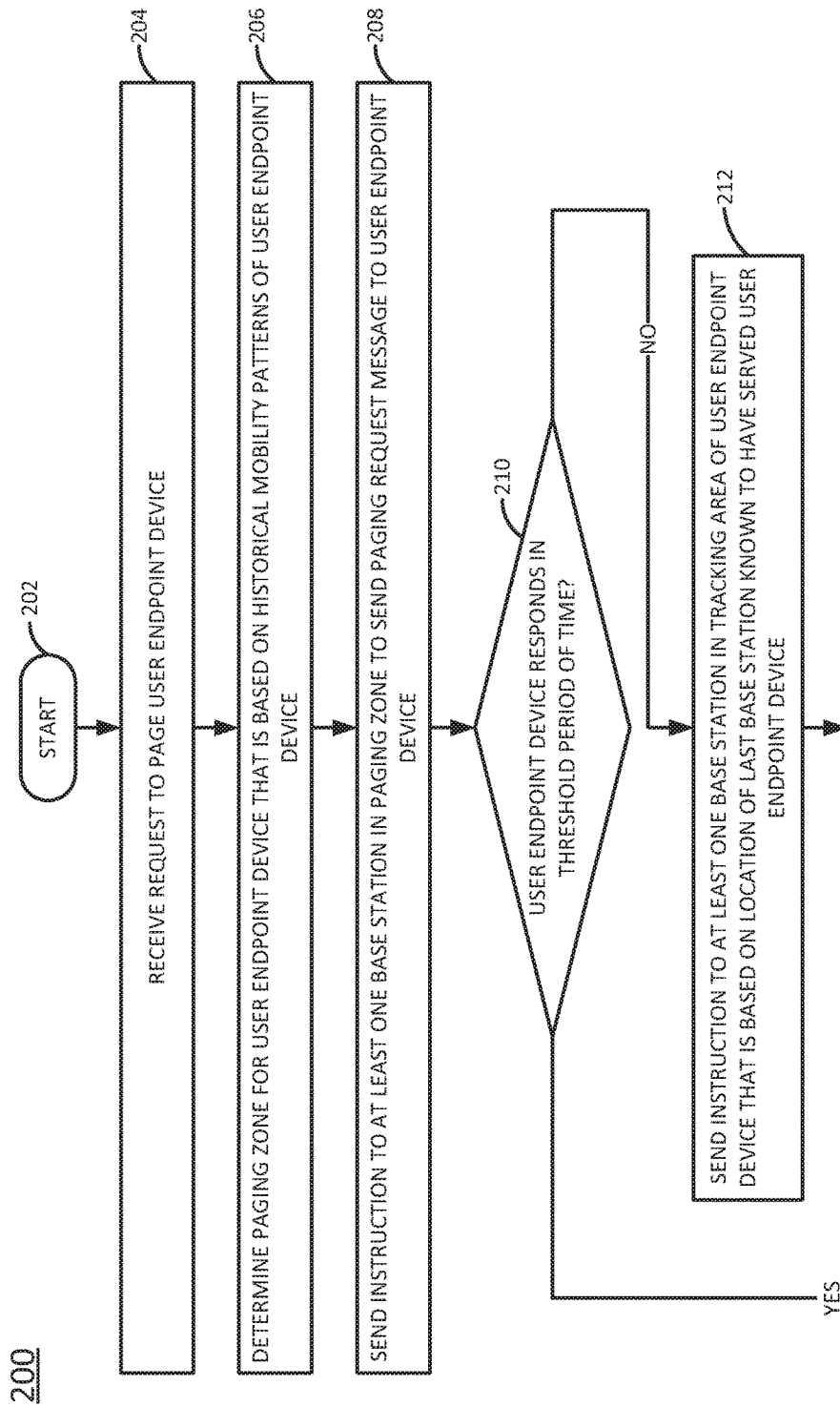
FIG. 2 illustrates a flowchart of a first example method for paging a user endpoint device based on the mobility patterns of the individual user associated with the user endpoint device.

To further aid in understanding the present disclosure, FIG. 2 illustrates a flowchart of a first example method 200 for paging a user endpoint device based on the mobility patterns of the individual user associated with the user endpoint device. In one example, the method 200 may be performed by an MME such as the MME 107 illustrated in FIG. 1. However, in other examples, the method 200 may be performed by another device (e.g., the AS 190 or AS 120 illustrated in FIG. 1). As such, any references in the discussion of the method 200 to MME 107 of FIG. 1 are not intended to limit the means by which the method 200 may be performed.

The method 200 begins in step 202. In step 204, the MME 107 receives a request to page a specific user endpoint device, u. For instance, another user endpoint device may be attempting to call the user endpoint device u.

In step 206, the MME determines the paging zone, z(i, u) for the user endpoint device u, based on the historical mobility patterns (e.g., repeating, observed patterns of behavior, as opposed to isolated mobility events such as simply the last-known location) of the user endpoint device u. In one example, the MME 107 constructs the paging zone z(i, u). However, in another example, the MME 107 requests the paging zone z(i, u) from another device, such as the AS 190 or AS 120.

The paging zone z(i, u) in which to broadcast a paging request message for a user endpoint device u that was last-known to have been located in the tracking area for base station i in can be constructed in one or more ways. In one example, for a user endpoint device u in the tracking area TA(i), the size of the tracking area TA(i) is assumed to be N, and the size of the expanded tracking area TA_list(i) (i.e., the number of base stations included) is assumed to be M. In this case, the base stations in the expanded tracking area TA_list (i) are arranged as an ordered set $\{j_1, j_2, \ldots, j_M\}$, so that:

$$p(i,j_1,u) \geq p(i,j_2,u) \geq \ldots \geq p(i,j_M,u) \qquad (\text{EQN. 1})$$

In other words, the base stations are arranged in order of descending probability that the user endpoint device u will respond to a paging request message from the base station j when the last-known base station to server the user endpoint device u was the base station i. Thus, the base station $j_1$ to which the user endpoint device u is most likely to respond is listed first, and the base station $j_M$ to which the user endpoint device u is least likely to respond is listed last.

Then, the base stations in the ordered set $\{j_1, j_2, \ldots, j_M\}$ are added into the paging zone z(i, u) in order, starting with the first base station $j_1$ and continuing until the base station $j_k$. In this case, the base station $j_k$ is the first base station in the ordered set $\{j_1, j_2, \ldots, j_M\}$ to meet the stopping criteria:

$$k+1+[1-\Sigma_{l=0}^{k+1} p(i,j_l,u)]*N > k+[1-\Sigma_{l=0}^{k} p(i,j_l,u)]*N \qquad (\text{EQN. 2})$$

In other words, the base station $j_k$ is the first base station which, if added to the paging zone z(i, u), would generate more paging request messages in the network.

In another example, the paging zone z(i, u) can be constructed from the ordered set $\{j_1, j_2, \ldots, j_M\}$ so that:

$$\Sigma_{l=0}^{k-1} p(i,j_l,u) \leq P \leq \Sigma_{l=0}^{k} p(i,j_l,u) \qquad (\text{EQN. 3})$$

or so that k=M. In the case of EQN. 3, P is a predefined threshold for paging success rate. Thus, the base station $j_k$ is the first base station which, if added to the paging zone z(i, u), would result in a paging success rate that is at least as great as the predefined threshold P.

In some cases, the amount of historical data for the user endpoint device u at base station i is too little to make statistical sense. For instance, the user endpoint device u may have never traveled to the area served by the base station i, or may have only been served by base station i once or twice in the past. In this case, any calculation of the probability p(i, j, u) may not be accurate, and a different method for constructing the paging zone z(i, u) may yield better results.

In one example, if the historical data shows that the number of times the user endpoint device u has been served by the base station i is less than a predefined threshold, λ, then the paging zone z(i, u) may be constructed using historical statistics from all user endpoint devices in the network. In this case, the paging zone, now denoted as Z(i), is independent of any one particular user endpoint device u. Furthermore, in this case, a probability p(i, j) is computed for each base station i. The probability p(i, j) is the probability that a user endpoint device responds to a paging request message broadcast from the base station j when the last-known base station to serve the user endpoint device was the base station i. This probability p(i, j) can be computed based on the historical data by counting the number of paging responses received from all user endpoint devices by the base station j, when the last-known base stations to serve those user endpoint devices was the base station i.

In one example, the paging zone Z(i) can then be created by assuming that the size of tracking area TA(i) is N, and that the size of the expanded tracking area TA_list(i) is M, as before. In this case, the base stations in the expanded tracking area TA_list(i) are arranged as an ordered set $\{j_1, j_2, \ldots, j_M\}$, so that:

$$p(i,j_1) \geq p(i,j_2) \geq \ldots \geq p(i,j_M) \qquad (\text{EQN. 4})$$

In other words, the base stations are arranged in order of descending probability that a user endpoint device will respond to a paging request message from the base station j when the last-known base station to server the user endpoint device was the base station i. Thus, the base station $j_1$ to which a user endpoint device is most likely to respond is listed first, and the base station $j_M$ to which a user endpoint device is least likely to respond is listed last.

Then, the base stations in the ordered set $\{j_1, j_2, \ldots, j_M\}$ are added into the paging zone Z(i) in order, starting with the first base station $j_1$ and continuing until the base station $j_k$. In this case, the base station $j_k$ is the first base station in the ordered set $\{j_1, j_2, \ldots, j_M\}$ to meet the stopping criteria:

$$k+1+[1-\Sigma_{l=0}^{k+1} p(i,j_l)]*N > k+[1-\Sigma_{l=0}^{k} p(i,j_l)]*N \qquad (\text{EQN. 5})$$

In other words, the base station $j_k$ is the first base station which, if added to the paging zone Z(i, u), would generate more paging request messages in the network.

In another example, the paging zone Z(i) can be constructed from the ordered set $\{j_1, j_2, \ldots, j_M\}$ so that:

$$\Sigma_{l=0}^{k-1} p(i,j_l) \leq P \leq \Sigma_{l=0}^{k} p(i,j_l) \qquad (\text{EQN. 6})$$

or so that k=M. In the case of EQN. 6, P is a predefined threshold for paging success rate. Thus, the base station $j_k$ is the first base station which, if added to the paging zone Z(i), would result in a paging success rate that is at least as great as the predefined threshold P.

As mentioned above, construction of the paging zones z(i, u) and/or Z(i) may be performed by the MME 107 or by another device in the network, such as the AS 190 or the AS 120. Regardless of where the paging zones z(i, u) and/or Z(i) are constructed, they will be communicated to the MME 107 so that the MME 107 can effectuate paging of the user endpoint devices according to the constructed paging zones z(i, u) and/or Z(i). The MME 107 may operate accordingly in either a passive or an active mode.

In the passive mode, the MME 107 may store paging zones Z(i) for all base stations i, constructed according to the above disclosure, but may not store paging zones z(i, u). That is, the MME 107 may not store user endpoint device-specific paging zones for all base stations i and all user endpoint devices u, due to the volume of data that would need to be stored. However, the MME 107 may store the current paging zone z(u) for a given user endpoint device u, which is based on the user endpoint device's last-known serving base station i at the present time. To do this, it may be necessary to detect the changes in the last-known serving base station for the user endpoint device u. Alternatively, it may be only necessary to detect when the user endpoint device u becomes inactive in the area served by the base station i (i.e., the last-known serving base station for the user endpoint device u). This is because when the user endpoint device u is active, paging may not be needed.

In the active mode, the MME 107 may store no paging zone information. When a user endpoint device u is to be paged, the MME 107 may, at this time, calculate or request the paging zone z(i, u) for the user endpoint device u based on the last-known base station i to serve the user endpoint device u.

Figure 3A:
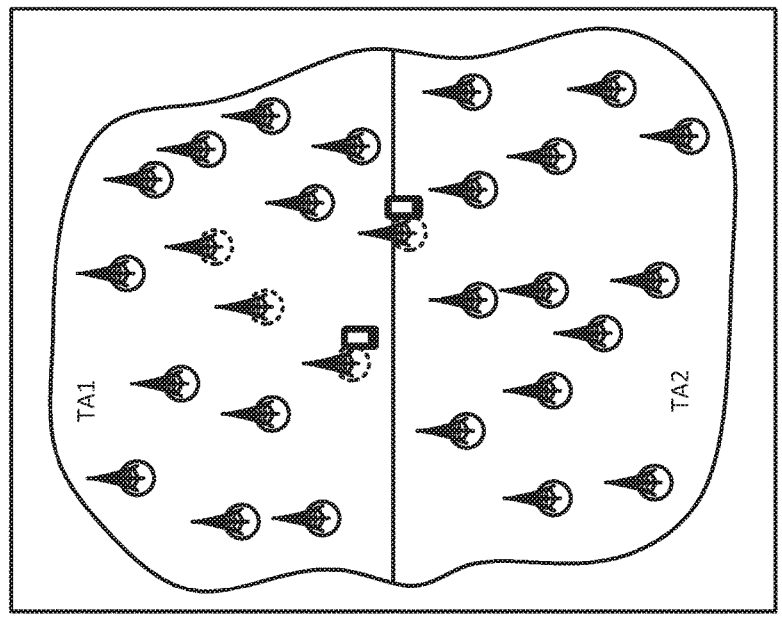
FIG. 3A illustrates an instruction being sent to all base stations in a paging zone of a user endpoint device.

Referring back to FIG. 2, once the MME 107 has obtained the paging zone z(i, u) or Z(i) for the user endpoint device u, the method 200 proceeds to step 208. In step 208, the MME 107 sends an instruction to at least one base station in the paging zone z(i, u) or Z(i) asking the at least one base station to send a paging request message to the user endpoint device u. In one example, the MME 107 may send the instruction to the first x base stations in the paging zone z(i, u) or Z(i) (e.g., the x base stations having the highest probabilities p(i, j, u) or p(i, j)). In another example, the MME 107 may send the instruction to all of the base stations in the paging zone z(i, u) or Z(i). FIG. 3A, for instance, illustrates an instruction (indicated by the darkened circles) being sent to all base stations in the paging zone z(i, u) or Z(i) of the user endpoint device u.

In step 210, the MME 107 determines whether the user endpoint device u has responded to the paging request message within a predefined threshold period of time (e.g., y seconds). If the MME 107 concludes in step 210 that the user endpoint device u has responded to the paging request message within the threshold period of time, then the method 200 ends in step 214.

Figure 3B:
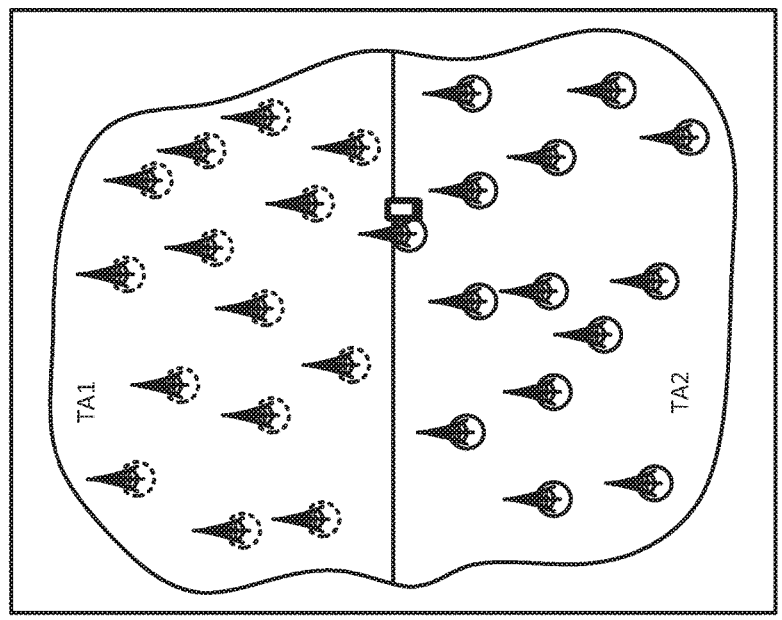
FIG. 3B illustrates an instruction being sent to all base stations in a tracking area of the user endpoint device of FIG. 3A.

If, however, the MME 107 concludes in step 210 that the user endpoint device u has not responded to the paging request message within the threshold period of time, then the method 200 proceeds to step 212. In step 212, the MME 107 sends the instruction to send the paging request message to all base stations in the user endpoint device's tracking area, TA(i). Thus, on this attempt, the instruction is sent to all stations serving the geographic area in which the last base station known to have served the user endpoint device u resides. FIG. 3B, for instance, illustrates an instruction (indicated by the darkened circles) being sent to all stations in the tracking area TA1 of the user endpoint device u of FIG. 3A.

The method 200 then ends in step 214.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

In further examples, the above-disclosed methods could be used to implement differentiated paging schemes. For example, different threshold values P for the paging success rate of EQNs. 3 and 6 can be used to produce different paging zones, e.g., $z(i, u, P_1)$ or $z(i, u, P_2)$, where $P_1 > P_2$. Then, the paging zone $z(i, u, P_1)$ with the higher paging success probability could be used when sending a paging request message for a higher priority service (e.g., voice call via VoLTE). The paging zone $z(i, u, P_2)$ with the lower paging success probability could be used when sending a paging request for a lower priority service.

Figure 4:
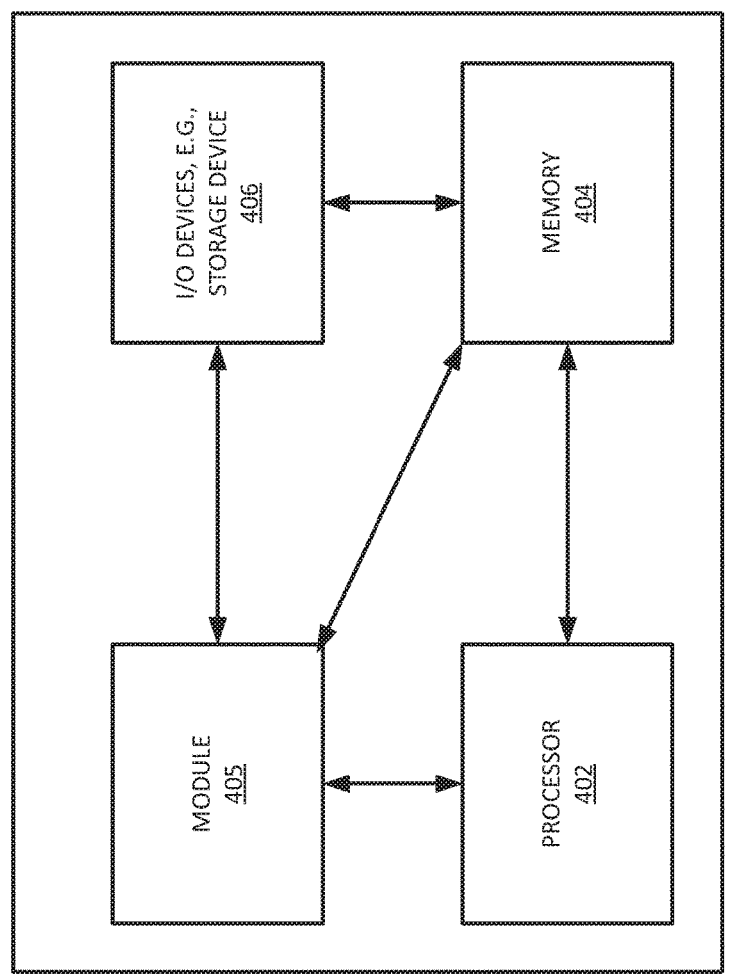
FIG. 4 depicts a high-level block diagram of a computing device specifically programmed to perform the functions described herein.

FIG. 4 depicts a high-level block diagram of a computing device specifically programmed to perform the functions described herein. For example, any one or more components or devices illustrated in FIG. 1 or described in connection with the method 200 may be implemented as the system 400. For instance, an application server or MME (such as might be used to perform the method 200) could be implemented as illustrated in FIG. 4.

As depicted in FIG. 4, the system 400 comprises a hardware processor element 402, a memory 404, a module 405 for constructing a paging zone, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for constructing a paging zone may include circuitry and/or logic for performing special purpose functions relating to the tracking and constructing an individual user's mobility patterns (e.g., repeating patterns of behavior with respect to mobility). The input/output devices 406 may include, for example, a camera, a video camera, storage devices (including but not limited to, a tape drive, a floppy drive, a hard disk drive or a compact disk drive), a receiver, a transmitter, a display, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for constructing a paging zone (e.g., a software program comprising computer-executable instructions) can be loaded into memory 404 and executed by hardware processor element 402 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for constructing a paging zone (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
   determining a paging zone for a user endpoint device, wherein the paging zone includes a first base station to page the user endpoint device, and wherein the first base station is included in the paging zone based at least in part on a historical mobility pattern of the user endpoint device and on present network conditions around the user endpoint device, wherein the paging zone is determined by:
   obtaining a first tracking area for the user endpoint device, wherein the first tracking area is served by a second base station that is a last base station to have served the user endpoint device;
   obtaining an expanded tracking area comprising the first tracking area and any neighboring tracking areas that are immediately adjacent to the first tracking area;
   arranging a plurality of base stations residing in the expanded tracking area in an ordered set that lists the plurality of base stations in a descending order of probability that the user endpoint device will respond to a paging request message from a respective base station of the plurality of base stations when the second base station was the last base station to have served the user endpoint device, wherein the first base station is included in the plurality of base stations;
   and
   sending an instruction to the first base station, wherein the instruction instructs the first base station to send a paging request message to the user endpoint device.

2. The method of claim 1, wherein the historical mobility pattern comprises an observed, repeated pattern of behavior of the user endpoint device with respect to mobility.

3. The method of claim 1, wherein the present network conditions around the user endpoint device comprise observed present network radio frequency, network traffic, and network mobility conditions in a geographic area within a defined radius of the user endpoint device.

4. The method of claim 1, wherein the probability is computed, for the respective base station, by computing a number of paging responses received by the respective base station from the user endpoint device when a last-known location of the user endpoint device was in the first tracking area.

5. The method of claim 1, wherein the probability is computed, for the respective base station, based on an estimated pattern of movement of the user endpoint device and on respective geographical locations of the second base station and the respective base station.

6. The method of claim 1, wherein the paging zone is further determined by:
adding the plurality of base stations from the ordered set into the paging zone in the descending order, until a stopping criterion is reached.

7. The method of claim 6, wherein the stopping criterion is the addition of a third base station to the paging zone, and wherein the addition of the third base station to the paging zone first causes more paging request messages to be generated in the access network.

8. The method of claim 6, wherein the stopping criterion is the addition of a third base station to the paging zone, and wherein the addition of the third base station to the paging zone first causes a paging success rate to at least meet a predefined threshold.

9. The method of claim 8, wherein a value of the predefined threshold is variable depending on a priority of a service associated with the paging request message.

10. The method of claim 1, further comprising:
determining that the user endpoint device has not responded to the paging request message within a threshold period of time; and
in response to the determining, sending the instruction to a second base station serving a tracking area of the user endpoint device, wherein the tracking area is a geographic areas served by a last base station to have served the user endpoint device.

11. The method of claim 1, wherein the paging zone comprises a plurality of base stations including the first base station.

12. A device, comprising:
a processor; and
a computer-readable medium storing instructions which, when executed by the processor, cause the processor to perform operations comprising:
determining a paging zone for a user endpoint device, wherein the paging zone includes a first base station to page the user endpoint device, and wherein the first base station is included in the paging zone based at least in part on a historical mobility pattern of the user endpoint device and on present network conditions around the user endpoint device, wherein the paging zone is determined by:
obtaining a first tracking area for the user endpoint device, wherein the first tracking area is served by a second base station that is a last base station to have served the user endpoint device;
obtaining an expanded tracking area comprising the first tracking area and any neighboring tracking areas that are immediately adjacent to the first tracking area;
arranging a plurality of base stations residing in the expanded tracking area in an ordered set that lists the plurality of base stations in a descending order of probability that the user endpoint device will respond to a paging request message from a respective base station of the plurality of base stations when the second base station was the last base station to have served the user endpoint device, wherein the first base station is included in the plurality of base stations;
and
sending an instruction to the first base station, wherein the instruction instructs the first base station to send a paging request message to the user endpoint device.

13. The device of claim 12, wherein the historical mobility pattern comprises an observed, repeated pattern of behavior of the user endpoint device with respect to mobility.

14. The device of claim 12, wherein the present network conditions around the user endpoint device comprise observed present network radio frequency, network traffic, and network mobility conditions in a geographic area within a defined radius of the user endpoint device.

15. The device of claim 12, wherein the probability is computed, for the respective base station, by computing a number of paging responses received by the respective base station from the user endpoint device when a last-known location of the user endpoint device was in the first tracking area.

16. The device of claim 12, wherein the probability is computed, for the respective base station, based on an estimated pattern of movement of the user endpoint device and on respective geographical locations of the second base station and the respective base station.

17. The device of claim 12, wherein the paging zone is further determined by:
adding the plurality of base stations from the ordered set into the paging zone in the descending order, until a stopping criterion is reached.

18. The device of claim 17, wherein the stopping criterion is the addition of a third base station to the paging zone, and wherein the addition of the third base station to the paging zone first causes more paging request messages to be generated in the access network.

19. The device of claim 17, wherein the stopping criterion is the addition of a third base station to the paging zone, and wherein the addition of the third base station to the paging zone first causes a paging success rate to at least meet a predefined threshold.

20. An apparatus, comprising:
a processor for determining a paging zone for a user endpoint device, wherein the paging zone includes a first base station to page the user endpoint device, and wherein the first base station is included in the paging zone based at least in part on a historical mobility pattern of the user endpoint device and on present network conditions around the user endpoint device, wherein the paging zone is determined by:
obtaining a first tracking area for the user endpoint device, wherein the first tracking area is served by a second base station that is a last base station to have served the user endpoint device;
obtaining an expanded tracking area comprising the first tracking area and any neighboring tracking areas that are immediately adjacent to the first tracking area;
arranging a plurality of base stations residing in the expanded tracking area in an ordered set that lists the plurality of base stations in a descending order of probability that the user endpoint device will respond to a paging request message from a respective base station of the plurality of base stations when the second base station was the last base station to have served the user endpoint device, wherein the first base station is included in the plurality of base stations; and an output device for sending an instruction to the first base station, wherein the instruction instructs the first base station to send a paging request message to the user endpoint device.

* * * * *